United States Patent [19]
Saito

[11] Patent Number: 4,588,308
[45] Date of Patent: May 13, 1986

[54] TEMPERATURE MEASURING DEVICE WITH THERMOCOUPLE

[75] Inventor: Hideyuki Saito, Tokyo, Japan

[73] Assignee: Nissan Motor Co., Ltd., Yokohama, Japan

[21] Appl. No.: 645,626

[22] Filed: Aug. 30, 1984

[30] Foreign Application Priority Data

Sep. 2, 1983 [JP] Japan ................... 58-161600

[51] Int. Cl.$^4$ .......................... G01K 7/02; G01K 7/12
[52] U.S. Cl. ..................... 374/181; 364/557; 364/571; 374/170
[58] Field of Search ............... 374/163, 164, 169, 172, 374/181, 170

[56] References Cited

U.S. PATENT DOCUMENTS

| | | | |
|---|---|---|---|
| 3,487,201 | 12/1969 | Beranek | 374/169 X |
| 3,507,152 | 4/1970 | Ritscher | 374/169 X |
| 3,534,809 | 10/1970 | Chavitat, Jr. | 374/182 X |
| 3,541,857 | 11/1970 | Massey | 374/172 |
| 3,688,580 | 9/1972 | Jarzembski | 374/182 |
| 3,921,453 | 11/1975 | Platzer, Jr. | 374/181 |
| 4,157,663 | 6/1979 | Ihlenfeldt et al. | 374/182 X |
| 4,403,296 | 9/1983 | Prosky | 374/181 X |
| 4,423,968 | 1/1984 | Nemcek, Sr. et al. | |

FOREIGN PATENT DOCUMENTS 5263506 11/1975 Japan .
53-32075 3/1978 Japan .

Primary Examiner—Daniel M. Yasich
Attorney, Agent, or Firm—Schwartz, Jeffery, Schwaab, Mack, Blumenthal & Evans

[57] ABSTRACT

A temperature measuring device according to the present invention includes a temperature sensor which is arranged in the vicinity of reference contacts to detect the variations in temperature of the reference contacts, and a processing circuit which outputs a signal corresponding to the temperature at the measuring point by compensating the temperature at the reference contacts based on the output signal from a thermocouple and the output signal from the temperature sensor. The reference contacts and the temperature sensor connected to the processing circuit by transmission lead wires, respectively.

6 Claims, 4 Drawing Figures

TEMPERATURE MEASURING DEVICE WITH THERMOCOUPLE

BACKGROUND OF THE INVENTION

1. Field of the Invention

The present invention relates to a temperature measuring device utilizing a thermocouple, in particular, to a temperature measuring device which makes it possible to greatly reduce lengths of thermocouple extension lead wires thereof or even to eliminate the use of such wires altogether.

2. Description of the Prior Art

In a prior art temperature measuring device with a thermocouple, pieces of two kinds of metal are joined together at two points one of which is used as the measuring point while the other is used as the reference point. Metals thus joined are cut across at an appropriate point, and the temperature determination is made based on the potential difference created between the cut ends at the appropriate point. In the above device, the reference point is placed in a thermostatic vessel such as an ice-filled water tank in order to maintain its temperature at a constant value.

However, in this system, the price for the device becomes high due to the use of the large size of the thermostatic vessel for the reference point. Moreover, it requires much labor to operate the device because of the maintenance requirements, such as the monitoring of temperature of the thermostatic vessel. As a result, that device is very poorly suited for various industrial purposes.

As other devices, there is known a device which can dispense with the thermostatic vessel.

This device has a reference contact compensator which includes a constant voltage source, resistors, and a current source. The reference contact compensator detects the variation in the temperature at the reference contact and compensates the corresponding variations in the output voltage, in order to ensure a constant temperature at the reference contact.

However, in a reference contact compensator like the one in the above, the length of the thermocouple extension lead wires which connect the thermocouple to the reference contact is necessarily large. This is because the reference contact is provided either closer to the processing circuit for the output voltage than the measuring point or within the processing circuit, due to the reasons for heat-proofing and installing convenience. Although the lead wires are less expensive than the thermocouple, they are still more expensive than the ordinary lead wires, due to the requirement of a pair of lead wires with similar thermoelectromotive forces, resulting in a high cost for the device. Furthermore, the thermocouple extension lead wires, due to their compensating function in accordance with the variations in the temperature, have different compositions of the constituent metals, and hence naturally different electrical resistances. Therefore, the difference in resistances increases in proportion to the length of the lead wires. Then, in the view from the processing circuit, the impedances at the input terminals of the processing circuit are out of balance. Therefore, it is difficult to eliminate the external noise component which is mixed into the transmission route and the common mode voltage element which arises from the insulation resistance of the thermocouple relative to the ground. This causes an increase in the errors of the measurements. Moreover, an extremely high accuracy is required for the reference contact compensator due to the fact that it deals with the compensation voltage which is smaller than the thermoelectromotive forces that is on the order of millivolt. As a result, the selection of the elements themselves and the adjustment of the circuit become extremely time-consuming. However, for the troubles taken, the resulting accuracy and stability of the device are often not up to the expectation. In short, the prior art devices in the above suffer from the problems that are described in the foregoing.

SUMMARY OF THE INVENTION

An object of the present invention is to provide a temperature measuring device which makes it possible to reduce the measurement errors to very small values.

Another object of the present invention is to provide a temperature measuring device with high accuracy.

Another object of the present invention is to provide a temperature measuring device which makes it possible to reduce the length of the thermocouple extension lead wires to a very small value or to eliminate such wires altogether.

Still another object of the present invention is to provide a temperature measuring device which does not require the use of the thermostatic vessel.

Briefly described, these and other objects of the present invention are accomplished by the provision of an improved temperature measuring device which includes a temperature sensor which is arranged at the reference contact to detect the variations in temperature of the reference contact, a processing circuit which outputs a signal corresponding to the temperature at the measuring point by compensating the temperature at the reference contact based on the output signal from the thermocouple and the output signal from the temperature sensor, and transmission lead wires which transmit the output signal from the thermocouple and the output signal from the temperature sensor to the processing circuit.

BRIEF DESCRIPTION OF THE DRAWING

These and other objects, features and advantages of the present invention will be more apparent from the following description of a preferred embodiment, taken in conjunction with the accompanying drawings, in which.

DESCRIPTION OF THE PREFERRED EMBODIMENTS

Figure 1:
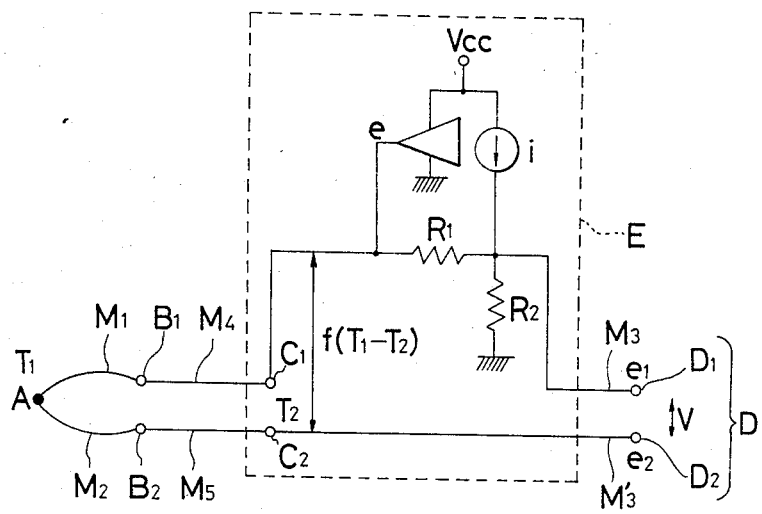
FIG. 1 is a simplified diagram of a prior art temperature measuring device which utilizes a reference contact compensator.

To facilitate the understanding of the present invention, a brief reference will be made to a prior art temperature measuring device illustrated in FIG. 1.

As shown, the temperature measuring device is provided with a thermocouple $M_1$ and $M_2$, and a reference contact compensator E. The thermocouple $M_1, M_2$ is connected to the reference contact ($C_1, C_2$) in the reference contact compensator E by thermocouple extension lead wires $M_4$ and $M_5$ which have electromotive force characteristics being identical to those of the thermocouple $M_1$ and $M_2$. The reference contact compensator E includes a constant voltage source e, resistors $R_1$ and $R_2$, and an electric current source i. The reference contact compensator E detects the temperature $T_2$ of the reference contact ($C_1$ and $C_2$). At its output terminals D, the reference contact compensator E produces an output voltage V which causes the temperature $T_2$ at the reference contact ($C_1, C_2$) to be equivalent to a prescribed temperature $T_0$ by compensating the thermoelectromotive force according to the variations in the temperature $T_2$.

Namely, a thermoelectromotive force $V_0 = f(T_2 - T_0)$, which is produced by the difference ($T_2 - T_0$) between the temperature $T_2$ at the reference contact ($C1, C2$) and a prescribed temperature $T_0$ (frequently chosen as 0 C), is calculated by an operational circuit in the reference contact compensator E. By summing the thermoelectromotive force $V_0$ and the electromotive force $f(T_1 - T_2)$ which is produced by the difference ($T_1 - T_2$) between the temperature $T_1$ at the measuring point A and the temperature $T_2$ at the reference contact ($C_1, C_2$), the reference contact compensator E produces at its output terminals D an output voltage V given by $$V = V_1 + V_0 = f(T_1 - T_2) + f(T_2 - T_0).$$

Assuming that f may be regarded as linear in the range of interest, V becomes $$V = f(T_1 - T_2) + f(T_2 - T_0) = f(T_1 - T_2 + T_2 - T_0)$$
$$= f(T_1 - T_0).$$

This shows clearly, as mentioned earlier, that the voltage V corresponds equivalently to the thermoelectromotive force in the case where the temperature T2 of the reference contact ($C_1, C_2$) is set to the prescribed temperature $T_0$.

However, the prior art device of this kind has the following drawbacks.

(1) For the reasons of heat-proofing and mounting, the reference contact compensator E is installed either closer to the processing circuit (not shown) for the output voltage V than the measuring point or within the processing circuit. Because of this, the thermocouple extension lead wires $M_4$ and $M_5$ are necessarily long in length. The thermocouple extension lead wires $M_4$ and $M_5$, although less expensive than the thermocouple, are more expensive than the ordinary lead wires, resulting in higher cost of the device.

(2) Due to the compensating function in accordance with the variations in temperature, the thermocouple extension lead wires $M_4$ and $M_5$ should have different compositions of the constituent metals with naturally different values of electrical resistance. The difference in resistance increases in proportion to the wiring length of the thermocouple extension lead wires $M_4$ and $M_5$. Thus, viewing the thermocouple side from the processing circuit which is connected to the output terminals D, the impedance at the two terminals $D_1$ and $D_2$ are out of balance. This makes it difficult to remove the external noise element which is mixed into the transmission routes $M_4, M_5, M_3, M_3$ and the common mode voltage component which arises due to insulation resistance of the thermocouple relative to the ground. This leads to an increase in the measurement errors. This problem is quite serious in thermocouple where the voltage output is only on the order of milli-volt.

(3) Since the compensating voltage is one order of magnitude smaller than the thermoelectromotive force which has is of the order of a milli-volt, an extremely high accuracy is required for the reference contact compensator. Therefore, when the operational circuit is constructed by elements such as operational amplifiers, resistors, and the like, unusual care is exercised in connection with the selection of the elements themselves and the adjustments of the circuit. However, for the effort expended, the results (the accuracy and the stability) are seldom up to the expectation. Furthermore, the integrated circuits for the device have recently been put into market by the various makers. However, they are expensive.

The present invention is successful to eliminate such problems and will now be described with reference to FIG. 2 and 4.

Figure 2:
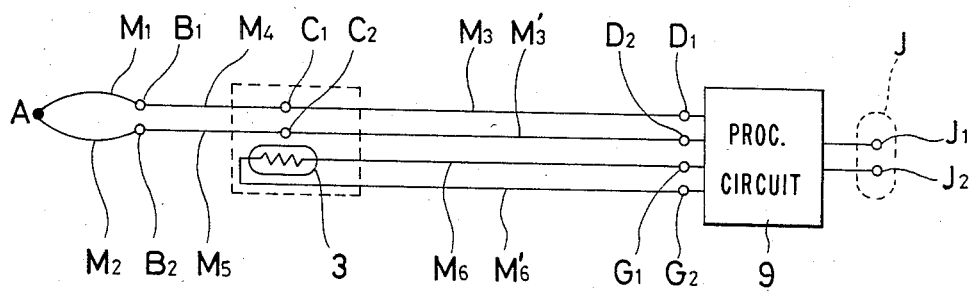
FIG. 2 is a simplified diagram of an embodiment of a temperature measuring device in accordance with the present invention.

As shown in FIG. 2, the embodiment of the temperature measuring device in accordance with the present invention includes a temperature sensor 3 and a processing circuit 9. The temperature sensor 3 is installed in the vicinity of the reference contact ($C_1, C_2$) of the thermocouple $M_1$ and $M_2$, and detects the temperature of the reference contact ($C_1, C_2$). The processing circuit 9 produces an output signal corresponding to the temperature at the measuring point A by compensating the temperature of the reference contact (C1, C2) based on the output signal from the thermocouple $M_1$ and $M_2$ and the output signal from the temperature sensor 3. The reference contact ($C_1, C_2$) and the thermocouple $M_1$, and $M_2$ are connected to the processing circuit 9 by the transmission lead wires $M_3$, $M'_3$ and $M_6$, $M'_6$ respectively. Therefore, the processing circuit 9 can be arranged away from the measuring point A. Moreover, transmission lead wires $M_3$, $M'_3$, $M_6$ and $M'_6$ are ordinary transmission lines for transmitting the output signals, thereby saving the cost of the device.

Figure 3:
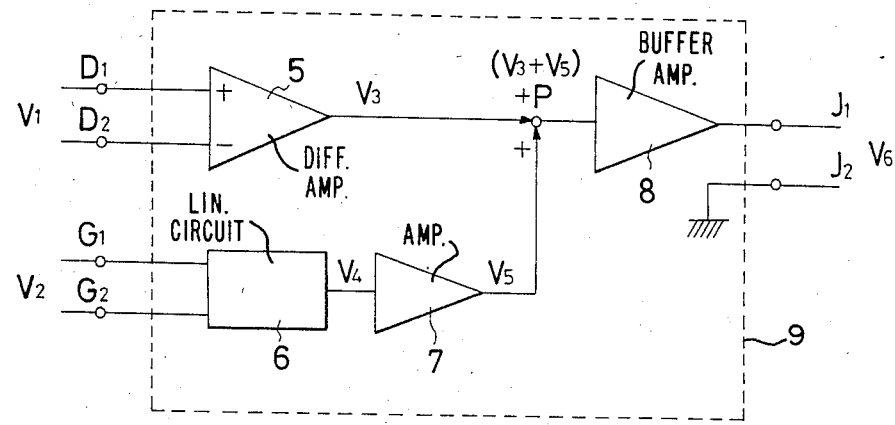
FIG. 3 is a block diagram of the processing circuit of the temperature measuring device shown in FIG. 2.

Referring to FIG. 3, the processing circuit comprises a differential amplifier circuit 5, a linearization circuit 6, an amplifier circuit 7, and a buffer amplifier circuit 8. The differential amplifier circuit 5 amplifies the output signal $V_1$ from the thermocouple M1 and M2. The linearization circuit 6 linearizes the output signal $V_2$ from the temperature sensor 3. The amplifier circuit 7 amplifies the linearized output signal $V_4$ from the linearization circuit 6 to the voltage $V_5$ which is on the same level as the thermoelectromotive force signal $V_3$. The buffer amplifier circuit 8 amplifies a resultant voltage signal V3+V5 obtained by combining the signals $V_3$ and $V_5$ and supplies the output signal V6.

The operation of the above embodiment will now be described.

At the reference contact ($C_1, C_2$) there will appear a thermoelectromotive force $V_1$ due to the difference ($T_1 - T_2$) between the temperatures T1 at the measuring point A and the temperature $T_2$ at the reference contact ($C_1, C_2$). Here, it is desirable to have shorter length of the thermocouple extension lead wires $M_4$ and $M_5$, from the viewpoints mentioned earlier, namely, reduction in cost, noise-proof capability, and removal of common mode voltage. In the above mentioned arrangement of the present embodiment, it is possible to reduce the length of the thermocouple extension lead wires M4 and M5 to an extremely short length for the heat-proof requirement and the output characteristic of the temperature sensor 3. It is even possible to eliminate the compensating lead wires M4 and M5 altogether and set the junction (B1,B2) of the thermocouple as the reference contact.

The separation between the reference contact (C1,C2) and the input terminals D1 and D2 of the processing circuit 9 may be increased to some extent. However, by utilizing the twisted pair or shielded twisted pair of the material for the transmission lead wires M3 and M'3 the noise-proof capability of these lines can be improved. At the input terminals D1 and D2 to the processing circuit 9, there is certain amount of noise to the thermoelectromotive force signal V1 at the reference contacts. However, the majority of the common element in the noise may be cancelled by the differential amplifier circuit 5 before it comes out as the output V3. Designating the gain of the differential amplifier circuit 5 as k, the output signal V3 may be expressed approximately as follows.

$$V_3 = kV_1 = kf(T_1 - T_2) = k(T_1 - T_2)f(0)$$

On the other hand, the signal V2 obtained at the temperature sensor 3 is transmitted to the input terminals G1, G2 of the processing circuit 9 by the transmission lead wires M6 and M6. The signal V2 is linearized with respect to its characteristic against the temperature T2 at the reference contact (C1,C2) by the linearization circuit 6, and is then amplified further by the amplifier circuit 7. As a result, an output appears which may be expressed roughly as $$V_5 = m_1 T_2 + m_2$$

(m1 and m2 are constants that are determined by the circuits 6 and 7). Therefore, the voltage that appears at the combining point P is given by the following:

$$\begin{aligned}V_3 + V_5 &= k(T_1 - T_2)f(0) + (m_1 T_2 + m_2) \\ &= [kf(0)]T_1 + [m_1 - kf(0)]T_2 + m_2\end{aligned}$$

If the constants k, m1, and m2 are chosen such that m1=kf(0) and m2=0, and if the gain of the buffer amplifier circuit 8 is assumed to the unity, then the output signal V6 at the output terminals J1 and J2 of the processing circuit 9 is given by $$V_6 = [kf(0)]T_1$$

That is, it is possible to determine the temperature at the measuring point A by $T_1 = V_6/kf(0)$. In other words, the processing circuit 9 is acting to cancel the variations in the thermoelectromotive force due to fluctuations of temperature T2 of the reference contacts C1 and C2.

Figure 4:
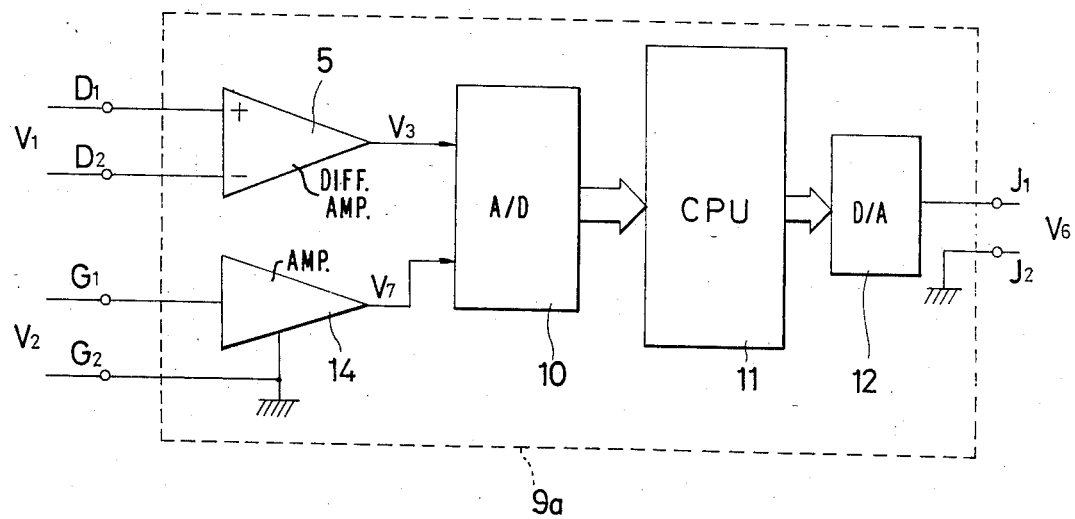
FIG. 4 is a block diagram of the processing circuit of another embodiment of the temperature measuring device in accordance with the present invention.

Referring to FIG. 4, there is shown a processing circuit 9a for the second embodiment of the temperature measuring device in accordance with the present invention. In this embodiment, the construction of the device is similar to the first embodiment except that a processing circuit with a microcomputer is utilized in place of the processing circuit 9 in the first embodiment.

In measuring temperature by means of a thermocouple, the use of a simple thermometer is rare, and in most cases it is intended for temperature control of the equipment. In carrying out such controls, it is becoming standard recently to employ a CPU like microprocessor and others so that the present embodiment will serve as an appropriate example in application for such cases.

Namely, the process for obtaining the voltage V3 by means of the differential amplifier circuit 5 is the same as the processing circuit 9 in the first embodiment. Following that stage, however, the signal is input into the CPU 11 via an A/D converter circuit 10. On the other hand, the reference temperature signal V2, too, is input into the CPU 11 via an amplifier circuit 14 (it may sometimes be an attenuator circuit) and the A/D converter circuit 10. In the processing circuit 9a, the linearization circuit 6 is not required.

If g represents a function determined by the characteristics of the thermocouple and the differential amplifier circuit 5, while h is a function determined by the characteristics of the temperature sensor and the amplifier circuit 61, $$V_3 = g(T_1 - T_2)$$

and $$V_7 = h(T_2),$$

Since the functions g and h are determined by the various conditions as mentioned in the above, they may be held in the CPU 11 as data. Then the temperature T1 may be determined as follows. That is, from $$T_1 - T_2 = g^1(V_3)$$

and $$T_2 = h^1(V_7),$$

it is only necessary to compute $$T_1 = g^1(V_3) + h^1(V_7).$$

The required control may be performed by the use of the temperature T1. Of course, it is also possible to take out the information as an output voltage V6 at the output terminals J1 and J2 by utilizing the D/A converter circuit 12.

In summary, according to the present invention, the construction of the temperature measuring device is arranged as follows. The electromotive force of the thermocouple itself is transmitted separately to the processing circuit. On the other hand, the temperature at the reference contact is detected independently by means of the temperature sensor, but the information on the temperature at the reference contact is reflected on the thermoelectromotive force. Due to this construction of the device, it becomes possible to accomplish the following advantages.

(1) The length of the thermocouple extension lead wires can be made extremely small, and can even be omitted altogether in fact, so that the cost of the device as a whole can be reduced.

(2) By reducing the length of the thermocouple extension lead wires to an extremely small value, it becomes possible to minimize the measurement errors due to noise and the like.

(3) It is possible to realize a high accuracy and high stability temperature compensation for the reference contact in terms of a relatively simple circuit.

The second embodiment of the invention includes the following advantage in addition to those enumerated in the above.

Namely, for the processing circuit shown in FIG. 4, it is possible to determine the measured temperature by means of the operational processing by holding the output characteristics for the temperature of the thermocouple and the temperature sensor in the CPU as data, provided that these characteristics are known, even if they are neither linear nor easily transformable to a linear form.

Various modifications will become possible for those skilled in the art after receiving the teachings of the present disclosure without departing from the scope thereof.

What is claimed is:

1. A temperature measuring device comprising:
    a thermocouple ($M_1$, $M_2$) having a first output signal ($V_1$) and a measuring point (A);
    reference contacts ($C_1$, $C_2$) connected to said thermocouple;
    a temperature detecting means (3), having a second output signal ($V_2$), arranged in the vicinity of said reference contacts ($C_1$, $C_2$), for detecting the temperature variation of said reference contacts ($C_1$, $C_2$);
    a processing means for calculating the temperature at said measuring point (A), said processing means comprising:
    (i) a differential amplifier circuit (5), having a third output signal ($V_3$), for amplifying said thermocouple output signal ($V_1$);
    (ii) a linearization circuit, having a fourth output signal ($V_4$), (6) for linearlizing said temperature detecting means output signal ($V_2$);
    (iii) an amplifier circuit (7), having a fifth output signal ($V_5$), for amplifying said linearized temperature detecting means fourth output signal ($V_4$); and
    (iv) a buffer amplifier circuit (8) for amplifying a resultant voltage signal ($V_3+V_5$) obtained by combining said differential amplifier third output signal ($V_3$) and said amplifier circuit fifth output signal ($V_5$) and outputting a sixth output signal ($V_6$) which corresponds to the temperature at said measuring point (A); and
    transmission lead wires ($M_3$, $M'_3$) for connecting said reference contacts ($C_1$, $C_2$) with said processing means to transmit said thermocouple output signal ($V_1$), and transmission lead wires ($M_6$, $M'_6$) for connecting said temperature detecting means (3) with said processing means to transmit said temperature detecting means output signal ($V_2$).

2. The temperature measuring device of claim 1, further comprising thermocouple extension lead wires for connecting said thermocouple to said reference contacts.

3. The temperature measuring device of claim 1, wherein said thermocouple is directly connected to said reference contacts.

4. A temperature measuring device comprising:
    a thermocouple ($M_1$, $M_2$) having a first output signal ($V_1$) and a measuring point (A);
    reference contacts ($C_1$, $C_2$) connected to said thermocouple;
    a temperature detecting means (3), having a second output signal ($V_2$), arranged in the vicinity of said reference contacts ($C_1$, $C_2$), for detecting the temperature variation of said reference contacts ($C_1$, $C_2$);
    a processing means for calculating the temperature at said measuring point (A), said processing means comprising:
    (i) a differential amplifier circuit (5), having a third analog output signal, for amplifying said thermocouple output signal ($V_1$);
    (ii) an amplifier circuit (14), having a fourth analog output signal ($V_4$), for amplifying said temperature detecting means output signal ($V_2$);
    (iii) an A/D converter (10) for converting said third and fourth analog output signals into digital signals;
    (iv) a CPU (11), having a fifth digital output signal, for computing the temperature at the measuring point (A) according to said digital signals; and
    (v) a D/A converter (12) for converting said CPU (11) digital output signal into an analog signal ($V_6$) corresponding to the temperature at the measuring point (A).

5. The temperature measuring device of claim 4, further comprising thermocouple extension lead wires for connecting said thermocouple to said reference contacts.

6. The temperature measuring device of claim 4, wherein said thermocouple is directly connected to said reference contacts.

* * * * *